(12) United States Patent
Ogata et al.

(10) Patent No.: US 6,402,616 B1
(45) Date of Patent: Jun. 11, 2002

(54) ENTERTAINMENT SYSTEM, SUPPLY MEDIUM, AND MANUAL CONTROL INPUT DEVICE

(75) Inventors: Hiroki Ogata; Shigehisa Miyasaka, both of Tokyo (JP)

(73) Assignee: Sony Computer Entertainment Inc. (JP)

( * ) Notice: Subject to any disclaimer, the term of this patent is extended or adjusted under 35 U.S.C. 154(b) by 0 days.

(21) Appl. No.: 09/360,722

(22) Filed: Jul. 26, 1999

(30) Foreign Application Priority Data

Jul. 31, 1998 (JP) .......................... 10-218293
Jul. 14, 1999 (JP) .......................... 11-200987

(51) Int. Cl.[7] .............................................. A63F 13/00
(52) U.S. Cl. ......................... 463/37; 345/170; 345/156
(58) Field of Search .................. 345/168–172; 341/20–22; 434/3, 21, 322, 202, 227–233; 463/36–39; 700/83–85

(56) References Cited

U.S. PATENT DOCUMENTS

| 4,378,217 A | * 3/1983 | Wilson et al. ............... 434/228 |
| 4,720,789 A | 1/1988 | Hector et al. ................ 364/410 |
| 5,011,412 A | * 4/1991 | Rosenberg ................... 434/227 |
| 5,078,399 A | 1/1992 | Lennon, Jr. ............. 273/148 B |
| 5,215,311 A | * 6/1993 | Schuller ......................... 463/9 |
| 5,759,100 A | 6/1998 | Nakanishi ..................... 463/37 |
| 6,093,104 A | * 7/2000 | Kasahara ...................... 463/30 |

FOREIGN PATENT DOCUMENTS

| EP | 0712650 A2 | 5/1996 | ............ A63F/9/22 |
| EP | 0 730 244 A1 | 9/1996 | ........... G06K/11/08 |
| EP | 0834338 A2 | 4/1998 | ............ A63F/9/22 |
| GB | 2 269 759 A | 2/1994 | ............ A63F/9/22 |
| JP | 2569815 | 2/1998 | |
| TW | 79203181 | 7/1991 | ............ G06C/7/02 |
| WO | WO 96/03736 | 2/1996 | ............ G09G/5/00 |
| WO | WO 97/32641 | 9/1997 | ............ A63F/9/22 |
| WO | WO98/15328 | 4/1998 | |

\* cited by examiner

*Primary Examiner*—Richard Hjerpe
*Assistant Examiner*—Alexander Eisen
(74) *Attorney, Agent, or Firm*—Lerner, David, Littenberg, Krumholz & Mentlik, LLP

(57) ABSTRACT

A main memory stores a program for enabling a plurality of control members of a manual control input device to emit light in a video game. A CPU executes the program stored in the main memory based on control commands from the manual control input device. The program sends light emission data to control member groups of the manual control input device to enable the control member groups to light successively. Since the control members of the manual control input device emit continuous or flickering light, the user can enjoy the video game because of visual sensations produced by the manual control input device.

15 Claims, 13 Drawing Sheets

FIG. 1  1 VIDEO GAME APPARATUS

4 VIDEO GAME MACHINE

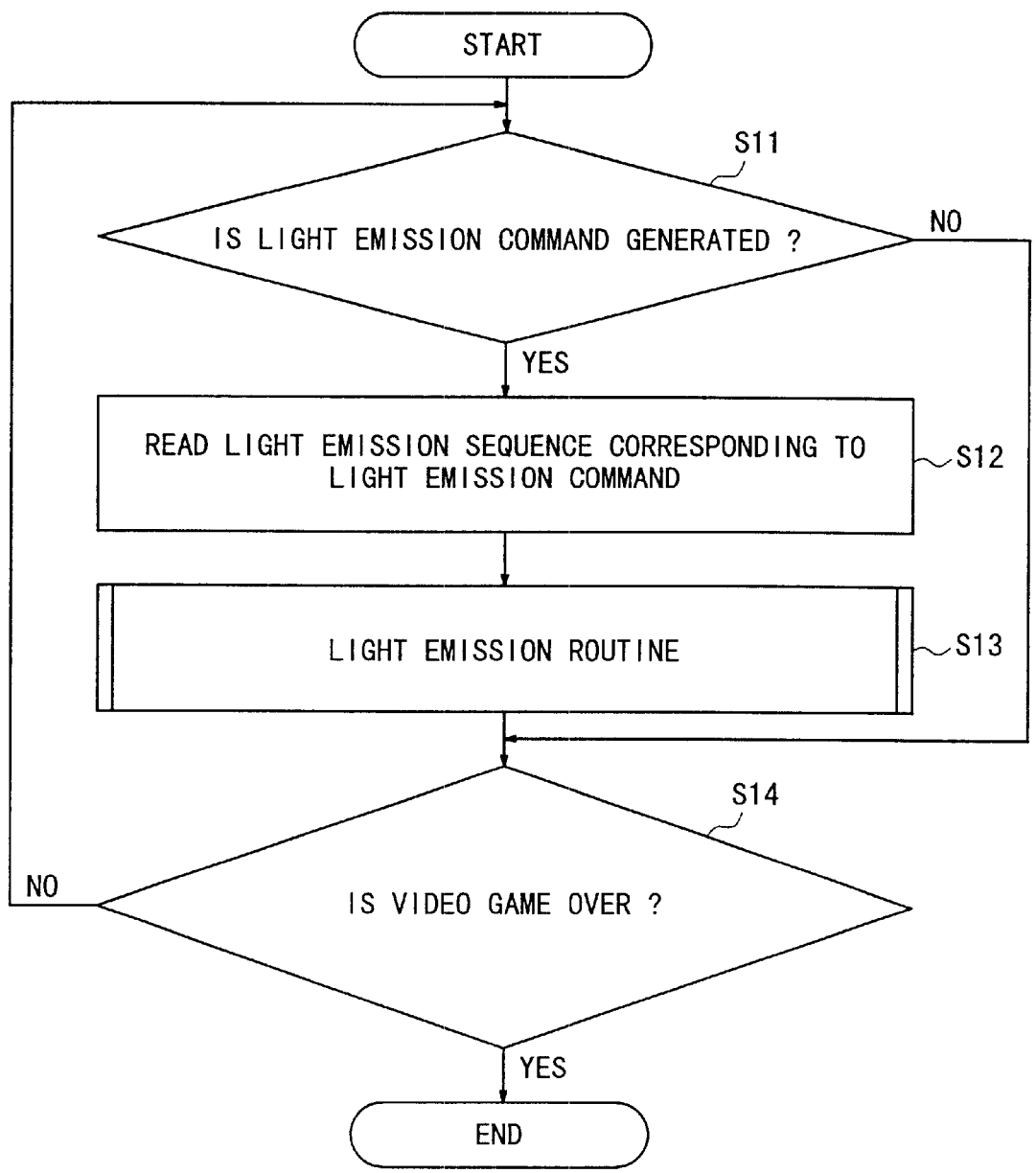

FIG. 15

| LIGHT EMISSION COMMAND | LIGHT EMISSION SEQUENCE |
|---|---|
| A | B1, B2, B3, B4 |
| B | B2, B1, B4 |
| ⋮ | ⋮ |
| Z | B2, B2, B3, B3 |

ENTERTAINMENT SYSTEM, SUPPLY MEDIUM, AND MANUAL CONTROL INPUT DEVICE

BACKGROUND OF THE INVENTION

1. Field of the Invention

The present invention relates to an entertainment system including a video game machine for displaying an image of game characters, etc. on a display monitor to proceed with a video game in response to control input commands manually entered by the game player via a manual control input device, a supply medium for supplying a program and data to such an entertainment system, and a manual control input device for use with such an entertainment system.

2. Description of the Related Art

Conventional video game apparatus for displaying game characters, etc. created by computer graphics (CG) on a display monitor such as a television receiver or the like to proceed with a video game each have at least one manual control input device peculiar to the video game apparatus. For example, if one user or game player plays a role-playing game, the game player moves, presses, or rotates a plurality of control members on a manual control input device with hands or fingers to move a game character or an object displayed on the screen of a monitor display.

Recent years have seen a number of game programs developed for entertainment systems including those video game apparatus. Those game programs include many role-playing game programs, combat game programs, car race game programs, sports game programs, etc.

Those game programs are supplied to video game entertainment systems from randomly accessible recording mediums such as CD-ROMs, memory cards, etc. or networks.

Heretofore, the manual control input devices that are used by the game player to enter control input commands as dictated by game programs have been designed such that the control members are simply pushed, tilted, or turned by the game player, and do not cause visual sensations for the game player.

For example, the control members of the conventional manual control input devices do not flicker for a few seconds after the video game apparatus are turned on, or the conventional manual control input devices themselves do not emit continuous or flickering light in timed relationship to continuous or flickering light emission of a game character or object displayed on the display monitor while the video game is in progress.

SUMMARY OF THE INVENTION

It is therefore an object of the present invention to provide an entertainment system which includes a manual control input device having control members that can emit continuous or flickering light to give visual sensations to the game player.

Another object of the present invention is to provide a supply medium for supplying a program and data for controlling a manual control input device to cause control members thereof to emit continuous or flickering light to give visual sensations to the game player.

Still another object of the present invention is to provide a manual control input device having control members that can emit continuous or flickering light to give visual sensations to the game player.

According to the present invention, an entertainment system includes a memory medium for storing a program for enabling a plurality of control members of a manual control input device to emit light, and a processing means for executing the program stored in the memory medium based on control commands entered by the manual control input device.

After the manual control input device is connected and a video game machine is turned on, the control members are enabled to emit continuous or flickering light for a predetermined period of time, or in timed relationship to continuous or flickering light emission of a game character or object displayed on a display monitor while a video game is in progress.

According to the present invention, there is also provided a supply medium for supplying a light emission program and data for a manual control input device for use in a video game performed by a video game machine by displaying a game character or object on a display monitor in response to control commands entered by a manual control input device, the light emission program comprising a program for enabling the control members to emit light either randomly or according to a predetermined pattern as the video game proceeds.

According to the present invention, there is further provided a manual control input device for supplying control commands to a video game machine in response to manual control inputs, comprising control means for enabling a plurality of control members to emit light.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 12A through 12C are plan views showing the manner in which groups of control members on the manual control input device are individually turned on;

FIGS. 13A through 13C are plan views showing the manner in which control members in a group of control members are individually turned on;

FIG. 14 is a flowchart of a second mode of processing operation which is carried out while a video game playing process is being performed;

FIG. 15 is a diagram showing a specific example of an association table used in the second mode of processing operation.

DESCRIPTION OF THE PREFERRED EMBODIMENTS

An embodiment in which an entertainment system according to the present invention is applied to a video game apparatus for playing a video game, an embodiment in which a supply medium according to the present invention is applied to a supply medium recording therein a program and data executed by the video game apparatus, and an embodiment in which a manual control input device according to the present invention is applied to a manual control input device used in the video game apparatus will be described below with reference to the drawings.

Figure 1:
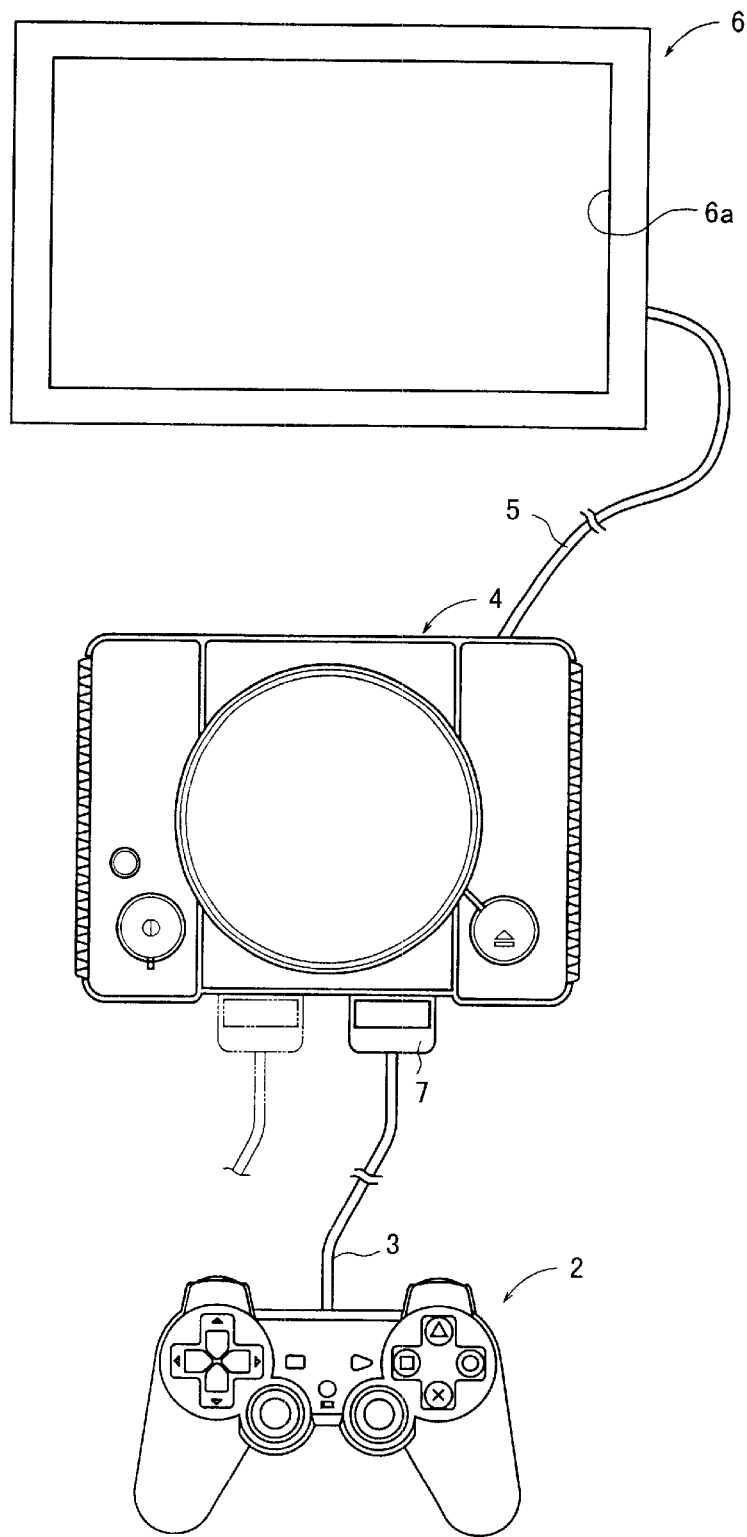
FIG. 1 is a view of a video game apparatus as an entertainment system according to the present invention.

As shown in FIG. 1, a video game apparatus 1 comprises a manual control input device 2, a video game machine 4 for reading a game program in response to a user's control action entered via the manual control input device 2 and generating a game character or characters and a background image according to image processing based on CG, for example, and a display monitor 6 such as a television receiver or the like for displaying the game character or characters and the background image that are generated by the video game machine 4.

The manual control input device 2 and the video game machine 4 are connected to each other by a cable 3, and the video game machine 4 and the display monitor 6 are connected to each other by a cable 5. Alternatively, control signals and data may be transmitted between the manual control input device 2, the video game machine 4, and the display monitor 6 by way of wireless communications, rather than the cables 3, 5.

Figure 2:
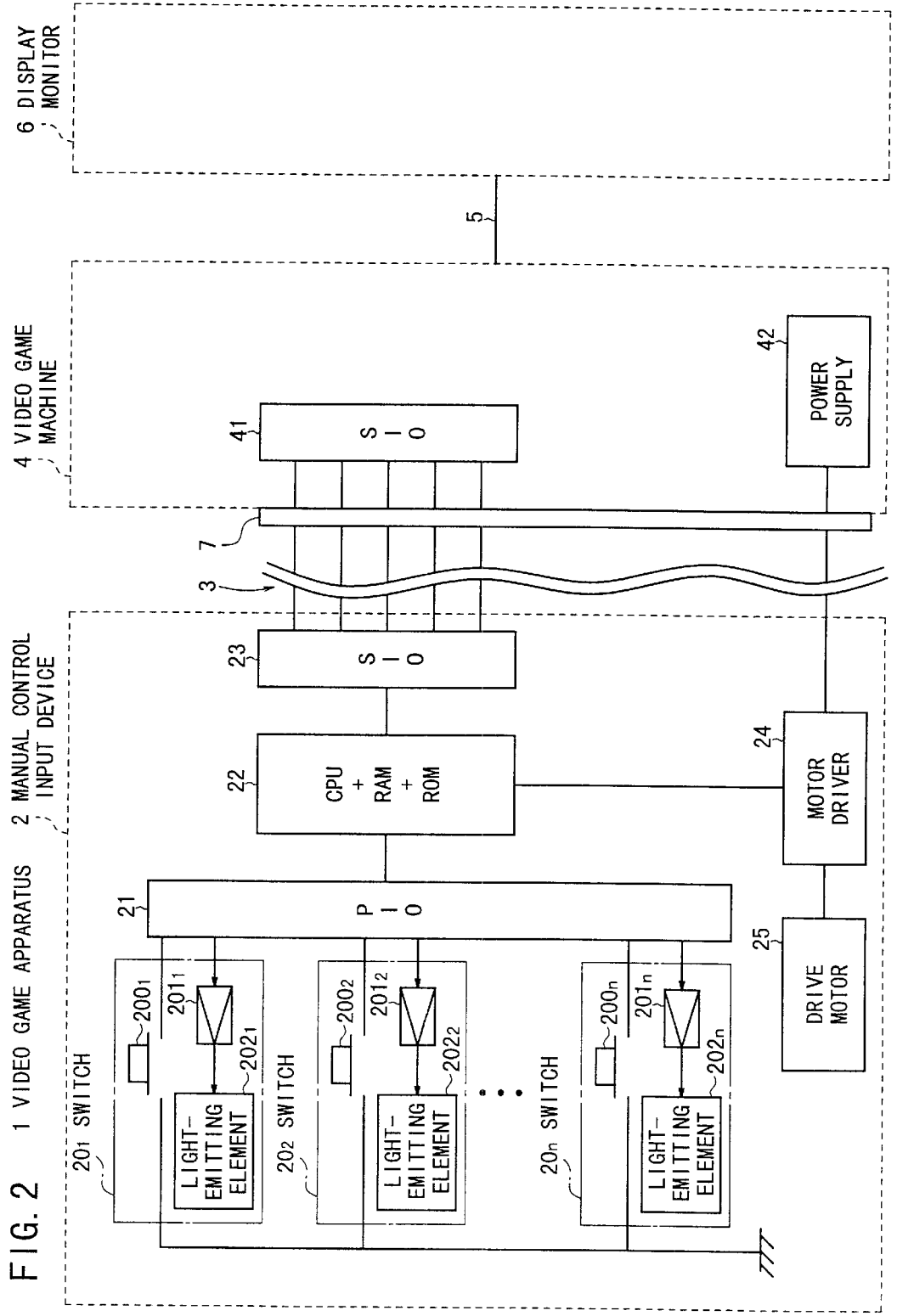
FIG. 2 is a block diagram of a circuit arrangement of the video game apparatus.

FIG. 2 shows in block form a circuit arrangement of the video game apparatus 1. Particularly, circuit details of the manual control input device 2 will be described below, and circuit details of the video game machine 4 will be described later on. Details of the display monitor 6 will not be described because they are well known in the art and have no direct bearing on the present invention.

The manual control input device 2 comprises a plurality of switches $20_1$, $20_2$, ... $20_n$ having respective control members $200_1$, $200_2$, ... $200_n$ such as buttons, sticks, etc., a parallel I/O interface (PIO) 21 for being supplied with control signals from the switches $20_1$, $20_2$, ... $21_n$ a one-chip microcomputer 22 including a central processing unit (CPU), a random-access memory (RAM), and a read-only memory (ROM) fabricated on a single chip, a serial I/O interface (SIO) 23 for performing serial communication with the vide game machine 4, and a motor driver 24 for supplying a drive current to a drive motor 25 to vibrate the manual control input device 2 based on a vibration generating command which is adaptively issued from the video game machine 4.

The switches $20_1$, $20_2$, ... $20_n$ include, in addition to the control members $200_1$, $200_2$, ... $200_n$, respective amplifiers $201_1$, $201_2$, ... $201_n$ for amplifying drive signals to enable the control members $200_1$, $200_2$, ... $200_n$ to emit continuous or flickering light, and respective light-emitting elements $202_1$, $202_2$, ... $202_n$ such as light-emitting diodes (LEDs), for example, for emitting light through the control members $200_1$, $200_2$, ... $200_n$ based on the amplified drive signals from the amplifiers $201_1$, $201_2$, ... $201_n$.

The video game machine 4 has an SIO 41 for performing serial communication with the manual control input device 2. When a connector 7 is connected to the video game machine 4, the SIO 41 and the SIO 23 of the manual control input device 2 are connected to each other by the connector 7 for bidirectional serial communication between the manual control input device 2 and the video game machine 4.

The video game machine 4 also has a power supply 42 for applying a power supply voltage to the motor driver 24 of the manual control input device 2.

A game program read into the video game machine 4 contains a process for enabling the control members $200_1$, $200_2$, ... $200_n$ to emit continuous or flickering light in response to commands from the video game machine 4.

The game program also contains a process for enabling the manual control input device 2 to emit continuous or flickering light in timed relationship to continuous or flickering light emission of a game character or object displayed on the display monitor 6 while the video game is in progress.

Prior to describing structural details for enabling the control members $200_1$, $200_2$, ... $200_n$ to emit continuous or flickering light, an appearance and components of the manual control input device 2 will first be described below with reference to FIGS. 3 and 4.

Figure 3:
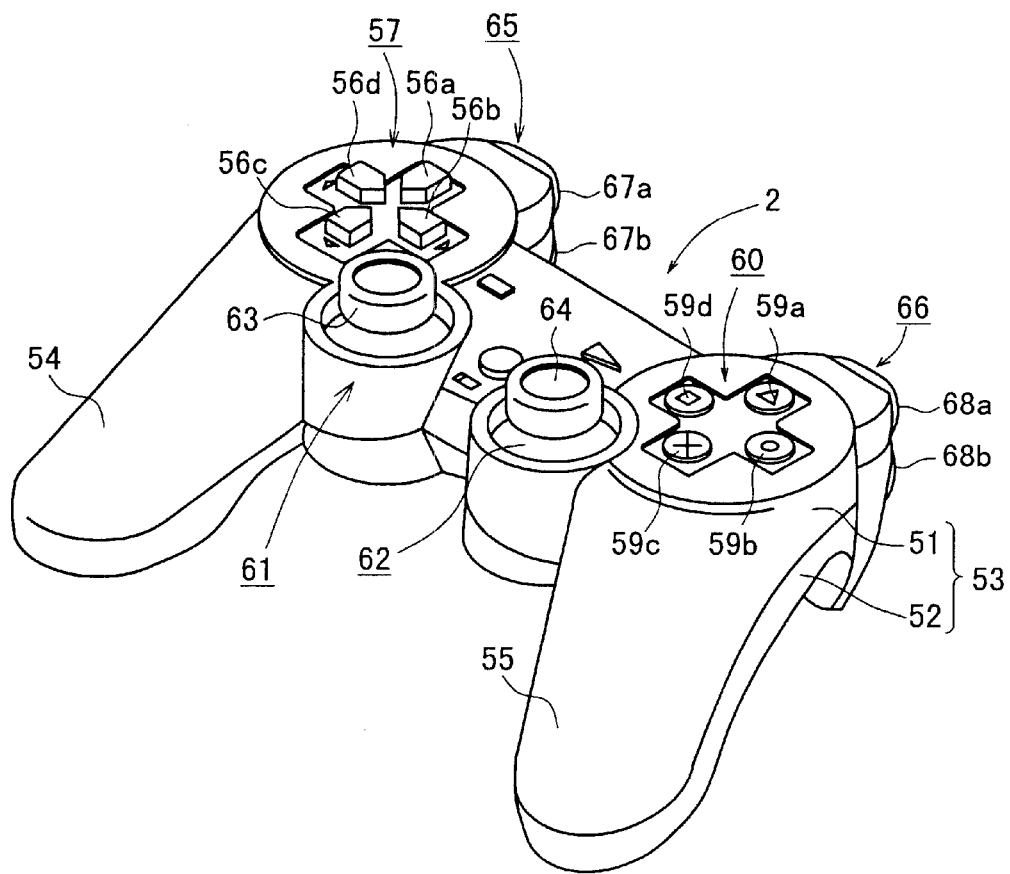
FIG. 3 is a perspective view of a manual control input device of the video game apparatus.

As shown in FIG. 3, the manual control input device 2 has a housing 53 comprising an upper member 51 and a lower member 52 which are mated and joined to each other by fasteners such as screws. A pair of first and second grips 54, 55 projects from one side of respective opposite ends of the housing 53. The first and second grips 54, 55 are shaped so as to be gripped by the palms of left and right hands of the user or game player when the manual control input device 2 is connected to the video game machine 4 and the video game is played thereby.

The first and second grips 54, 55 are progressively spaced away from each other toward their distal ends and inclined downwardly of the housing 53. To allow the game player to grip the first and second grips 54, 55 comfortably for a long period of time, the first and second grips 54, 55 are tapered from their joint with the housing 53 toward their distal ends, and have actuate outer peripheral surfaces and arcuate distal end surfaces.

The manual control input device 2 has a first control pad 57 disposed on one end of the housing 53 and comprising first through fourth pressable control members 56a, 56b, 56c, 56d. The first through fourth pressable control members 56a, 56b, 56c, 56d project on an upper surface of the housing 53 and are arranged in a crisscross pattern. The first through fourth pressable control members 56a, 56b, 56c, 56d are integrally formed with an angularly movable control body that is supported for angular movement about its center, and positioned around the center of the angularly movable control body.

The first through fourth pressable control members 56a, 56b, 56c, 56d are integrally coupled to each other by the angularly movable control body. The first control pad 57 includes switch elements as signal input elements associated respectively with the first through fourth pressable control members 56a, 56b, 56c, 56d.

The first control pad 57 functions as a directional controller for controlling the direction of movement of a game character or object (hereinafter collectively referred to as a displayed character) displayed on the screen of the display monitor 6. When the game player selectively presses the first through fourth pressable control members 56a, 56b, 56c, 56d to turn on or off the switch elements associated respectively with the first through fourth pressable control members 56a, 56b, 56c, 56d, the displayed character moves in the direction corresponding to the pressed one of the first through fourth pressable control members 56a, 56b, 56c, 56d.

The manual control input device 2 also has a second control pad 60 disposed on the other end of the housing 53 and comprising first through fourth pressable control members 59a, 59b, 59c, 59d. The first through fourth pressable control members 59a, 59b, 59c, 59d project on the upper surface of the housing 53 and are arranged in a crisscross pattern.

The first through fourth pressable control members 59a, 59b, 59c, 59d are constructed as independent members, and associated with respective switch elements disposed in the second control pad 60. The second control pad 60 serves as a function setting/performing unit for setting a function for a displayed character and performing a function of a displayed character. Specifically, when game player selectively presses the first through fourth pressable control members 59a, 59b, 59c, 59d, the corresponding one of the switch elements is turned on to set a function for a displayed character and perform a function of a displayed character, which function is assigned to the corresponding switch element.

The manual control input device 2 also has third and fourth control pads 61, 62 disposed respectively at confronting corners defined between the housing 53 and the distal ends of the first and second grips 54, 55 which are joined to the housing 53.

The third and fourth control pads 61, 62 have respective rotatable control members 63, 64 rotatable 360° about control shafts thereof, and respective signal input elements such as variable resistors or the like which are operable by the respective rotatable control members 63, 64. Specifically, the rotatable control members 63, 64 are mounted on tip ends of the control shafts that are normally urged to return to their neutral positions by biasing members, and can be rotated 360° about the axes of the control shafts.

The third and fourth control pads 61, 62 can move a displayed character while rotating the same or while changing its speed, and can make an analog-like action such as to change the form of a displayed character, when the game player rotates the rotatable control members 63, 64.

Therefore, the third and fourth control pads 61, 62 is used as a control unit for outputting commands for a displayed character to perform the above movement or action.

Alternatively, the third and fourth control pads 61, 62 may be used as a control unit for moving a displayed character in an analog fashion in a two-dimensional space in a way related to the manner in which the game player handles an object represented by the displayed character.

The manual control input device 2 also has fifth and sixth control pads 65, 66 disposed on a side of the housing 53 remote from the first and second grips 54, 55 and positioned respectively at the opposite ends of the housing 53. The fifth and sixth control pads 65, 66 have respective pairs of pressable control members 67a, 67b and 68a, 68b and respective switch elements associated respectively with the pressable control members 67a, 67b and 68a, 68b.

The fifth and sixth control pads 65, 66 serve as a function setting/performing unit for setting a function for a displayed character and performing a function of a displayed character. Specifically, when game player selectively presses the pressable control members 67a, 67b and 68a, 68b, the corresponding one of the switch elements is turned on to set a function for a displayed character and perform a function of a displayed character, which function is assigned to the corresponding switch element.

Figure 4:
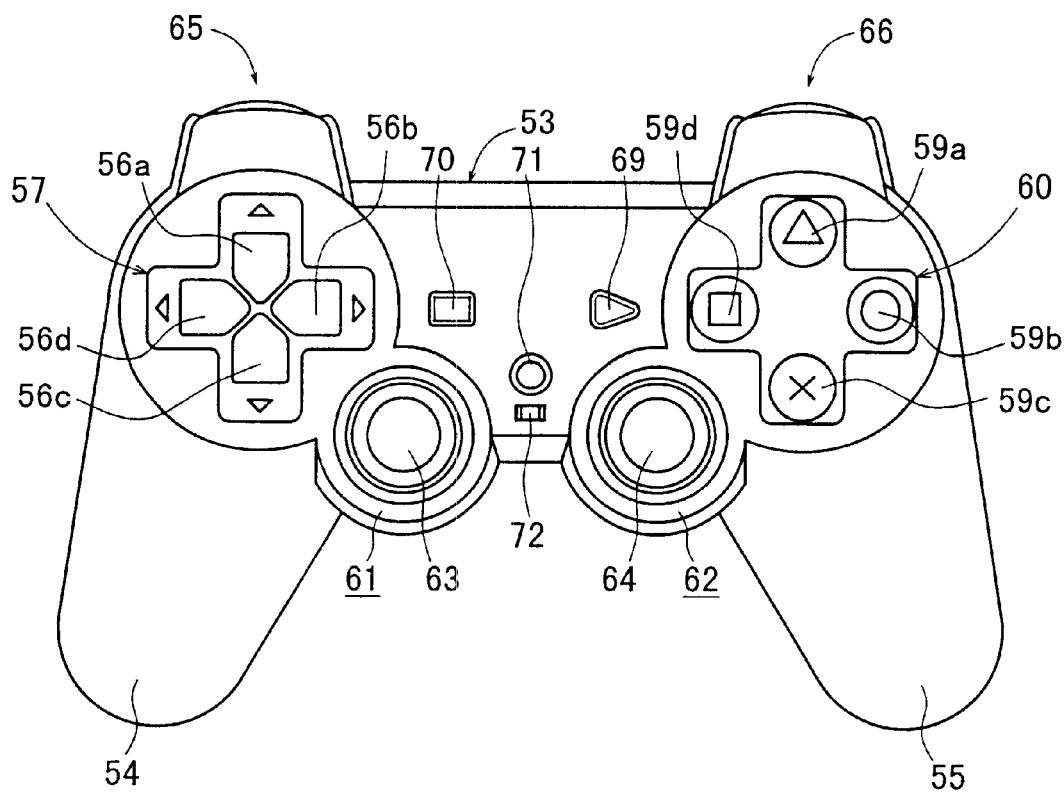
FIG. 4 is a plan view of the manual control input device shown in FIG. 3.

As shown in FIG. 4, the manual control input device 2 has a start switch 69 and a selection switch 70 that are disposed in parallel positions between the first control pad 57 and the second control pad 60 on the upper surface of the housing 53. The start switch 69 starts the video game when pressed, and the selection switch 70 selects a difficulty level of the video game.

The manual control input device 2 also has a mode selection switch 71 and an mode indicator 72 that are disposed between the third and fourth control pads 61, 62 on the upper surface of the housing 53. The mode selection switch 71 selects a control mode of the third and fourth control pads 61, 62 when pressed, and the mode indicator 72 indicates a selected control mode of the third and fourth control pads 61, 62. The mode indicator 72 comprises a light-emitting element such as an LED or the like.

When the mode selection switch 71 is pressed, it can select a control mode for allowing a command signal to be inputted from the third and fourth control pads 61, 62 or a control mode for inhibiting a command signal from being inputted from the third and fourth control pads 61, 62.

When the mode selection switch 71 is pressed, it can also select a control mode for allowing a command signal to be inputted from the third and fourth control pads 61, 62 and selecting the function of the first through fourth pressable control members 59a, 59b, 59c, 59d of the second control pad 60 or the function of the pressable control members 67a, 67b and 68a, 68b of the fifth and sixth control pads 65, 66. Depending on the control mode selected by the mode selection switch 71, the mode indicator 72 flickers and changes its indication light.

The rotatable control members 63, 64 are rotatable 360° about control shafts thereof. When the rotatable control members 63, 64 are rotated, a CPU in a control system (described later on) within the video game machine 4 acquires data entered depending on the rotation of the rotatable control members 63, 64, and determines a motion pattern according to the acquired data. After having established a motion based on the motion pattern, the CPU controls a graphic generating system to move a displayed character according to the established motion based on the rotation of the rotatable control members 63, 64.

The control members shown in FIGS. 3 and 4 emit continuous or flickering light with the circuit arrangement shown in FIG. 2. For example, the first through fourth pressable control members 59a, 59b, 59c, 59d of the second control pad 66 shown in FIG. 3 are associated respectively with the switches $20_1, 20_2, \ldots 20_n$ shown in FIG. 2.

In the switches $20_1, 20_2, \ldots 20_n$, the light-emitting elements $202_1, 202_2, \ldots 202_n$, which are disposed underneath the respective control members, emit continuous or flickering light based on continuous-light or flickering-light drive signals-generated under the control of the CPU in the video game machine 4, i.e., generated when the game program is executed by the CPU. The emitted continuous or flickering light passes through the first through fourth pressable control members 59a, 59b, 59c, 59d. Therefore, the game player sees as if the first through fourth pressable control members 59a, 59b, 59c, 59d emit the continuous or flickering light.

Actually, each of the first through fourth pressable control members 59a, 59b, 59c, 59d is constructed as shown in FIG. 5, 6, 7, or 8.

Figure 5:
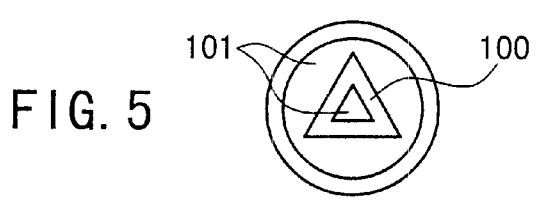
FIG. 5 is a plan view of a control member of the manual control input device.

FIG. 5 shows a control member structure in which the control member doubles as a light guide that includes a portion for emitting opalescent light. As shown in FIG. 5, the control member has a circular base molded of transparent plastic including a triangular area 100 coated in an opalescent color and a remaining area 101 coated in an ornamental color.

Figure 6:
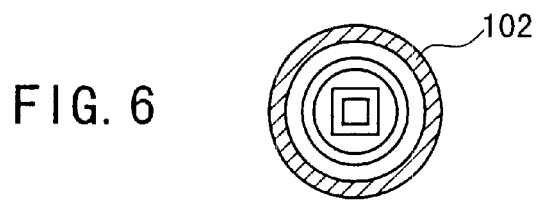
FIG. 6 is a plan view of another control member of the manual control input device.

FIG. 6 shows a control member structure in which a ring-shaped pattern is illuminated around the control member. As shown in FIG. 6, a ring-shaped area around the control member is molded of transparent polycarbonate and serves as a light guide in the form of a ring-shaped illuminating area 102. The control member structure shown in FIG. 6 should preferably incorporate a single light source.

Figure 7:
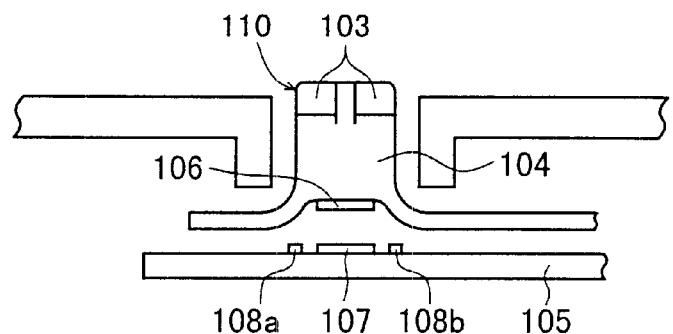
FIG. 7 is a cross-sectional view of a specific control member structure.
Figure 8:
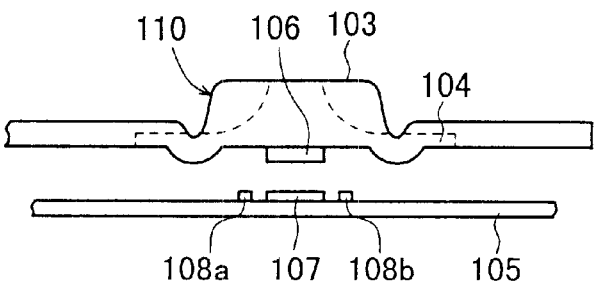
FIG. 8 is a cross-sectional view of another specific control member structure.

Other control member structures are shown in FIGS. 7 and 8. Each of the control member structures shown in FIGS. 7 and 8 comprises a flexible key 104 and a key top 103, which are of a conventional nature, molded of elastomer and ABS (acrylonitrile-butadiene-styrene copolymer) and combined into a control member 110 according to double-shot molding. In the double-shot molding, two material parts are simultaneously molded in one mold.

Specifically, the key top 103 of ABS and the flexible key 104 of elastomer are simultaneously molded in one mold, so that the key top 103 and the flexible key 104 are integrally combined with each other. The flexible key 104 serves as a light guide to illuminate the key top 103 with light guided through the flexible key 104.

As shown in FIGS. 7 and 8, a plurality of LEDs 108a, 108b are disposed around a switch 107 on a printed-circuit board 105. When the switch 107 is pressed by a presser 106 mounted on a lower end of the control member 110, the LEDs 108a, 108b emit continuous or flickering light. Therefore, when the control member 110 is pressed, continuous or flickering light emitted by the LEDs 108a, 108b passes through the flexible key 104 as the light guide to the key top 103. The game player can thus see as if the control member 110 itself emits continuous or flickering light.

The key top 103 may be made of PC (polycarbonate) rather than ABS.

Figure 9:
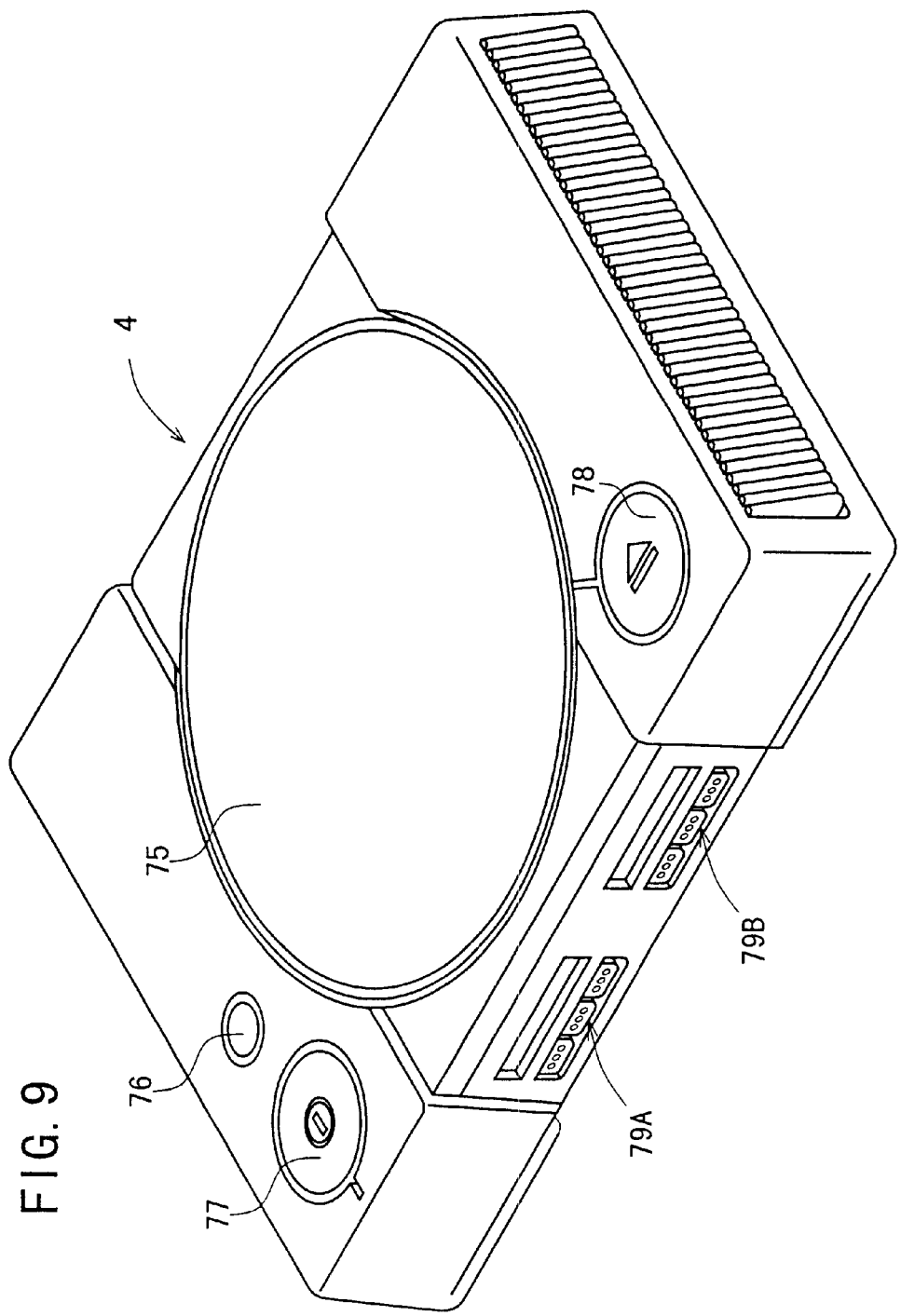
FIG. 9 is a perspective view of a video game machine of the video game apparatus.

Details of a structure and operation of the video game machine 4 will be described below with reference to FIGS. 9 and 10.

The video game machine 4 has a substantially rectangular casing which houses a disk loading unit 75 substantially centrally therein for loading an optical disk such as a CD-ROM or the like as a recording medium for supplying the game program. The casing supports a reset switch 76 for resetting the video game, a power supply switch 77, and a disk control switch 78 for controlling the loading of the optical disk into the disk loading unit 75, and has two slots 79A, 79B.

Two manual control input devices 2 can be connected to the respective slots 79A, 79B so that the video game may be played on the video game machine 4 by two users or game players. A memory card device and a portable electronic device may also be connected to the slots 79A, 79B. The video game machine 4 may have more or less than two slots 79A, 79B.

Figure 10:
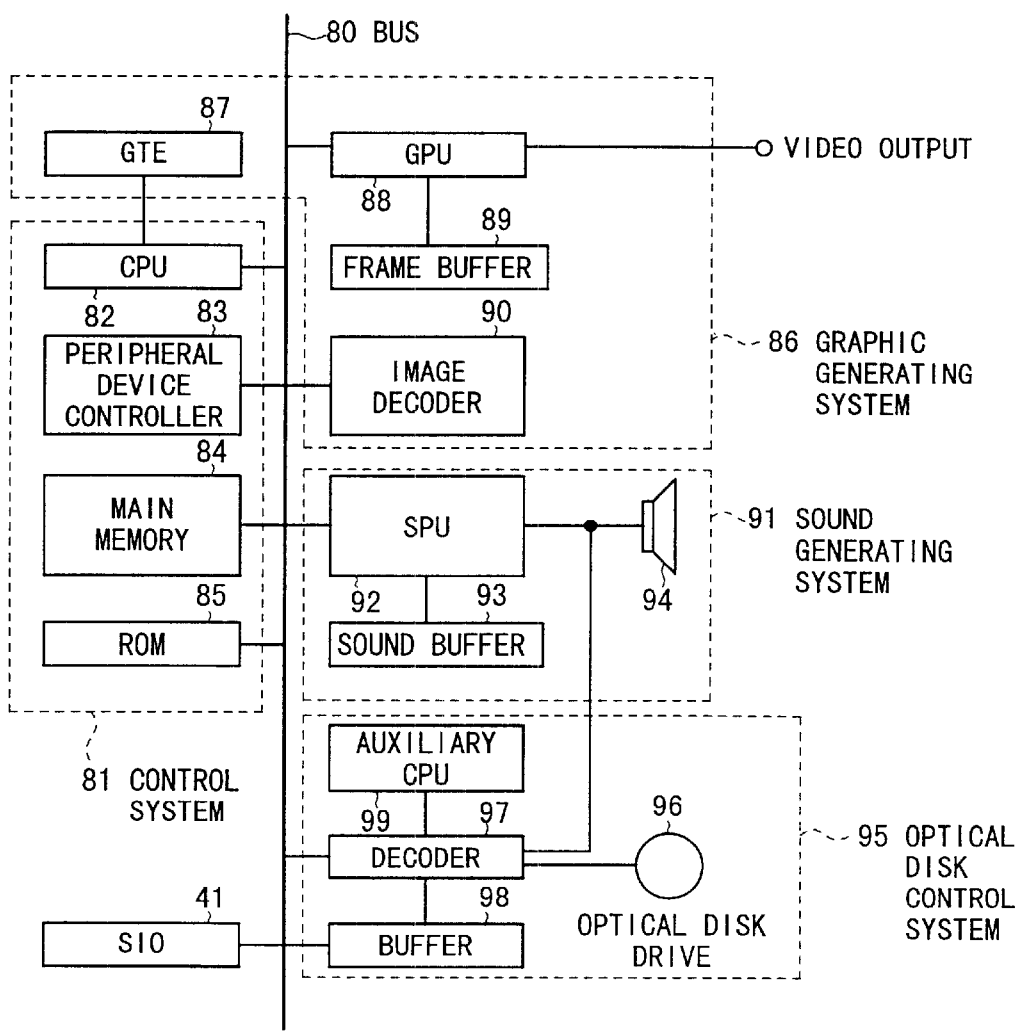
FIG. 10 is a block diagram of a circuit arrangement of the video game machine.

As shown in FIG. 10, the video game machine 4 has a control system 81 connected to a system bus 80, and a graphic generating system 86, a sound generating system 91, and an optical disk control system 95 which are connected to the control system 81 by the system bus 80.

The manual control input device 2 enters commands from the user or game player via the SIO 41 (see FIG. 2) to the video game machine 4. The optical disk control system 95 has an optical disk drive 96 in which a CD-ROM as an example of the supply medium according to the present invention is loaded.

The CD-ROM stores a program and data for giving an operation guidance to explain the functions of the control members of the manual control input device 2 while causing the control members to emit continuous or flickering light on the display monitor 6, and also to cause the corresponding control members to emit continuous or flickering light on the manual control input device 2 for thereby producing visual sensations for the game player.

The control system 81 controls the movement of a displayed character based on the program and data from the CD-ROM and commands entered from the manual control input device 2.

The control system 81 comprises a CPU (Central Processing Unit) 82, a peripheral device controller 83 for effecting interrupt control and controlling direct memory access (DMA) data transfer, a main memory 84 comprising a random-access memory (RAM), and a read-only memory (ROM) 85 which stores various programs such as an operating system for managing the graphic generating system 86, the sound generating system 91, etc. At least the game program can be executed in the main memory 84. The CPU 82 executes the operating system stored in the ROM 85 to control the video game apparatus in its entirety, and comprises a 32-bit RISC-CPU, for example. Operation details of the CPU 82 will be described later on.

When the video game machine 4 is turned on, the CPU 82 executes the operating system stored in the ROM 85 to start controlling the graphic generating system 86, the sound generating system 91, etc. When the operating system is executed, the CPU 82 initializes the video game apparatus 1 in its entirety for confirming its operation, and thereafter controls the optical disc controller 95 to execute an application program, such as the video game, recorded in the optical disk. As the application program is executed, the CPU 82 controls the graphic generating system 86, the sound generating system 91, etc. depending on instructions entered from the game player for thereby controlling the display of images and the generation of music sounds and sound effects. While the video game is in progress, the CPU 82 enables the manual control input device 2 to emit continuous or flickering light in timed relationship to continuous or flickering light emission of a game character or object displayed on the display monitor 6.

The graphic generating system 86 comprises a geometry transfer engine (GTE) 87 for performing coordinate transformations and other processing, a graphic processing unit (GPU) 88 for plotting image data according to commands from the CPU 82, a frame buffer 89 for storing image data plotted by the GPU 88, and an image decoder 90 for decoding image data compressed and encoded by an orthogonal transform such as a discrete cosine transform.

The GTE 87 has a parallel arithmetic mechanism for performing a plurality of arithmetic operations parallel to each other, and can perform coordinate transformations and light source calculations and calculating matrixes or vectors at a high speed in response to a request from the CPU 82. Specifically, the GTE 87 can calculate the coordinates of a maximum of 1.5 million polygons per second for a flat shading process to plot one triangular polygon with one color, for example. With the GTE 87, the video game machine 4 is able to reduce the burden on the CPU 82 and perform high-speed coordinate calculations.

According to an image plotting command from the CPU 82, to the GPU 88 plots a polygon or the like in the frame buffer 89. The GPU 88 is capable of plotting a maximum of 360 thousand polygons per second.

The frame buffer 89 comprises a dual-port RAM, and is capable of simultaneously storing image data plotted by the GPU 88 or image data transferred from the main memory 84, and reading image data for display. The frame buffer 89 has a storage capacity of 1 Mbytes, for example, and is handled as a 16-bit matrix made up of a horizontal row of 1024 pixels and a vertical column of 512 pixels.

The frame buffer 89 has a display area for storing image data to be outputted as video output data, a color lookup table (CLUT) area for storing a CLUT which will be referred to by the GPU 88 when it plots a polygon or the like, and a texture area for storing texture data to be subjected to coordinate transformations when a polygon is plotted and mapped onto a polygon plotted by the GPU 88. The CLUT area and the texture area are dynamically varied as the display area is varied.

The GPU 88 is capable of performing, in addition to the flat shading process, a Gouraud shading process for determining colors in a polygon by interpolating their intensities from the colors of the vertices of the polygon, and a texture mapping process for mapping texture data stored in the texture area onto a polygon. For the Gouraud shading process or the texture mapping process, the GTE 87 can calculate the coordinates of a maximum of 500 thousand polygons per second.

The image decoder 90 is controlled by the CPU 82 to decode image data of a still or moving image stored in the main memory 84, and store the decoded image into the main memory 84.

The image data reproduced by the image decoder 90 is transferred to the frame buffer 89 by the GPU 88, and can be used as a background for an image plotted by the GPU 88.

The sound generating system 91 comprises a sound processing unit (SPU) 92 for generating music sounds, sound effects, etc. based on commands from the CPU 82, a sound buffer 93 for storing waveform data from the SPU 92, and a speaker 94 for outputting music sounds, sound effects, etc. generated by the SPU 92.

The SPU 92 has an ADPCM (adaptive differential PCM) function for reproducing 16-bit sound data which has been encoded as 4-bit differential sound data by ADPCM, a reproducing function for reproducing the waveform data stored in the sound buffer 93 to generate sound effects, etc., and a modulating function for modulating and reproducing the waveform data stored in the sound buffer 93.

With these functions, the sound generating system 91 can be used as a sampling sound source which generates music sounds, sound effects, etc. based on the waveform data stored in the sound buffer 93 according to commands from the CPU 82.

The optical disk controller 95 comprises an optical disk drive 96 for reproducing programs and data recorded on an optical disk such as a CD-ROM or the like, a decoder 97 for decoding programs and data that are recorded with an error correcting code (ECC) added thereto, and a buffer 98 for temporarily storing data read from the optical disk drive 96 so as to allow the data from the optical disk to be read at a high speed. An auxiliary CPU 99 is connected to the decoder 97.

Sound data recorded on the optical disk which is read by the optical disk drive 96 includes PCM data converted from analog sound signals, in addition to the ADPCM data.

The ADPCM data, which is recorded as 4-bit differential data of 16-bit digital data, is decoded by the decoder 97, supplied to the SPU 92, converted thereby into analog data, and applied to drive the speaker 94.

The PCM data, which is recorded as 16-bit digital data, is decoded by the decoder 97 and then applied to drive the speaker 96.

The optical disk drive 96 reads the program for giving the operation guidance based on visual sensations from the CD-ROM which is a specific example of the supply medium according to the present invention. The decoder 97 then decodes the program thus read by the optical disk drive 96.

In order to enable the manual control input device 2 to emit continuous or flickering light in timed relationship to continuous or flickering light emission of a game character or object displayed on the display monitor 6 while the video game is in progress, it is necessary for the video game machine 4 to execute a program for emitting such continuous or flickering light.

A program for enabling the control members of the manual control input device 2 to emit continuous or flickering light will be described below. The program may be supplied from an optical disk such as a CD-ROM or distributed from a network. In the following description, it is assumed that the program is read from a CD-ROM into the video game machine 4.

Figure 11:
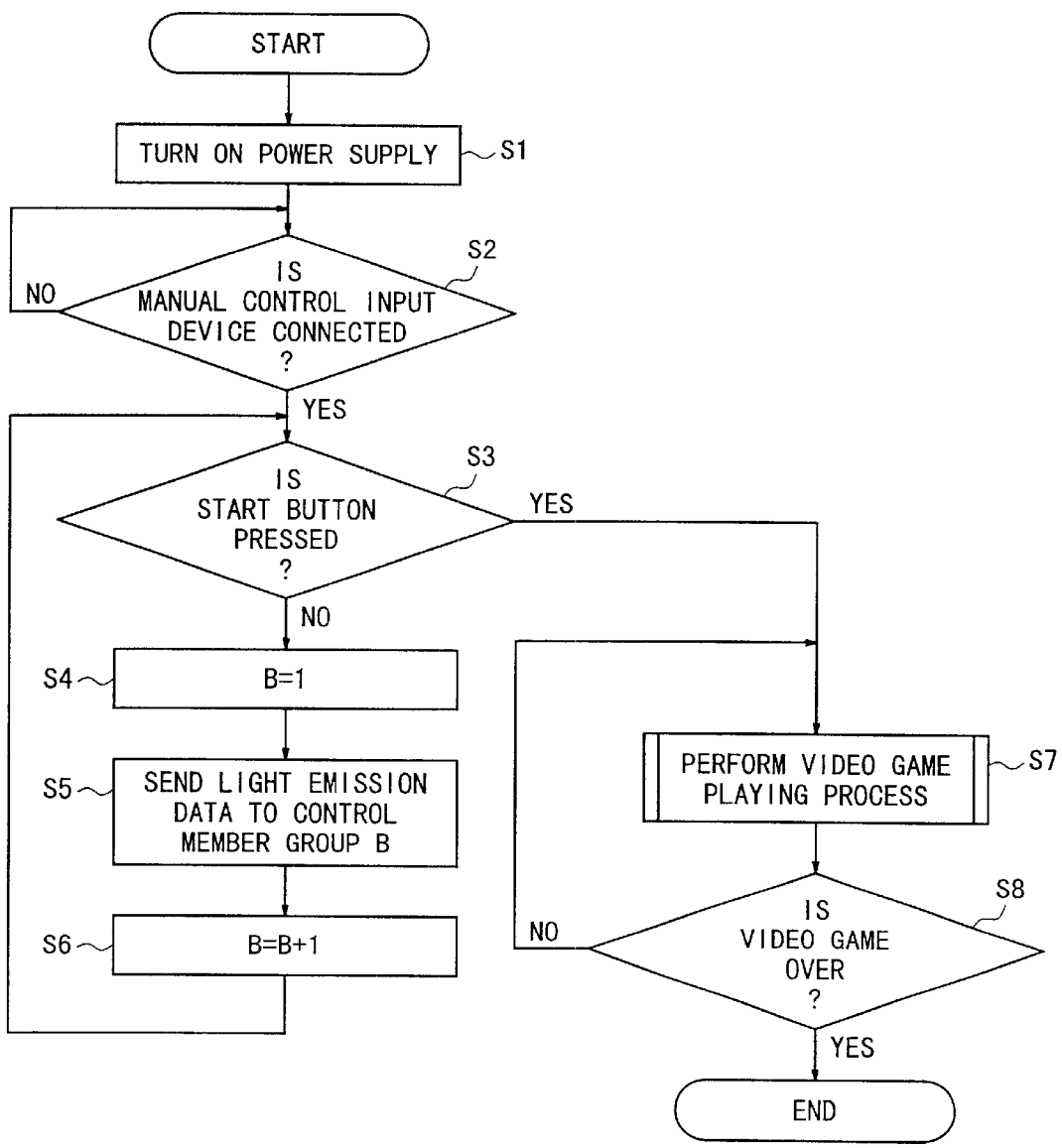
FIG. 11 is a flowchart of an operation sequence of the video game apparatus.

An operation sequence of the video game apparatus 1 will be described below with reference to FIG. 11.

In the video game apparatus 1, the manual control input device 2 is controlled by the CPU 82 in the video game machine 4 to enable the control members to emit continuous or flickering light. Specifically, after the manual control input device 2 is connected to the video game machine 4 and turned on, two modes (first and second modes) are selectively executed depending on whether the start button 69 is pressed or not.

It is assumed that the game player presses the power supply switch 77 of the video game machine 4 in step S1. If the manual control input device is connected to the video game machine 4 in step S2, then control goes to step S3 which decides whether the start button 69 of the manual control input device 2 is pressed or not.

Figure 12A:
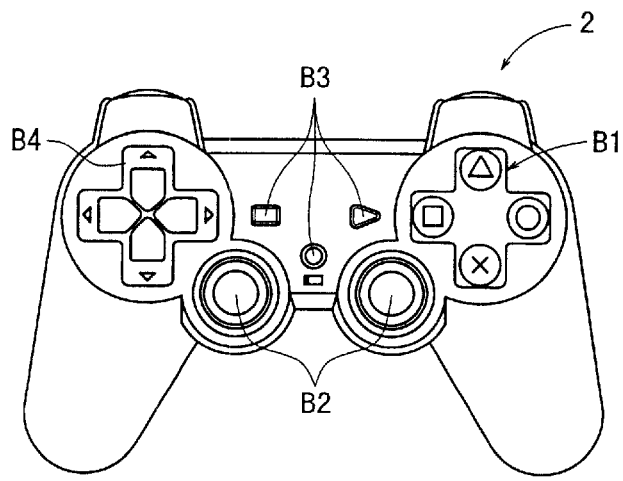
Figure 12B:
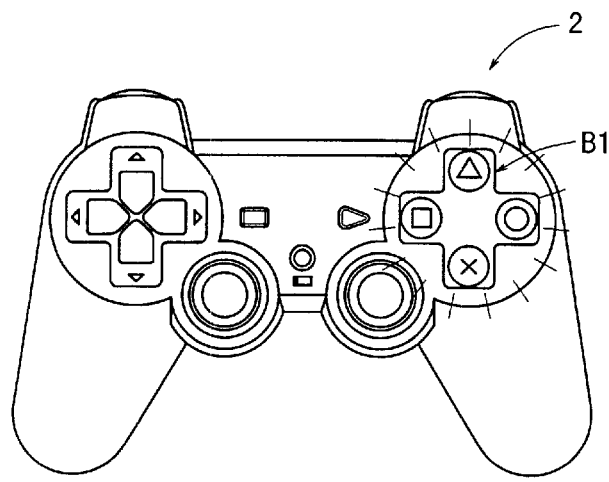
Figure 12C:
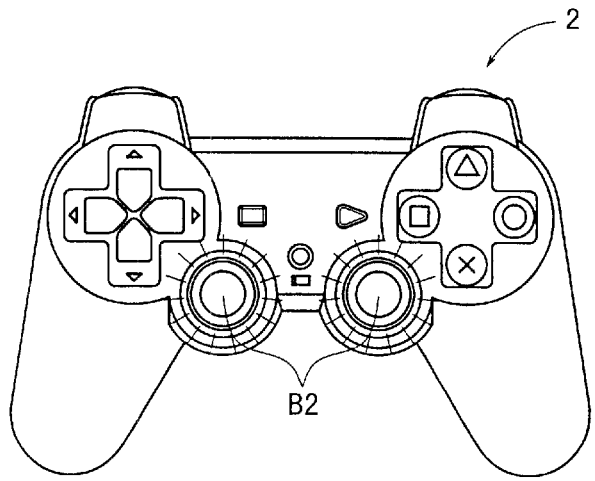

If the start button 69 is not pressed in step S3, then control goes to steps S4, S5, S6 in the first mode. Specifically, light emission data are successively sent to control member groups B1, B2, B3, B4 shown in FIG. 12A to enable their control members to emit light successively for a predetermined period of time, as shown in FIGS. 12B and 12C.

Figure 13A:
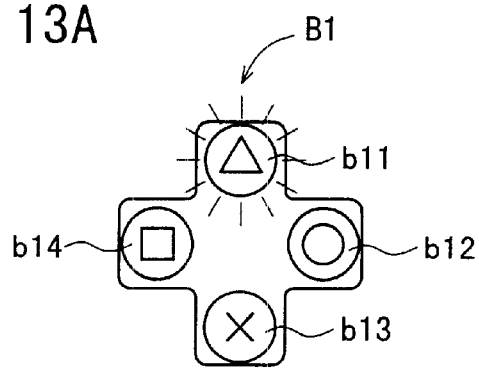
Figure 13B:
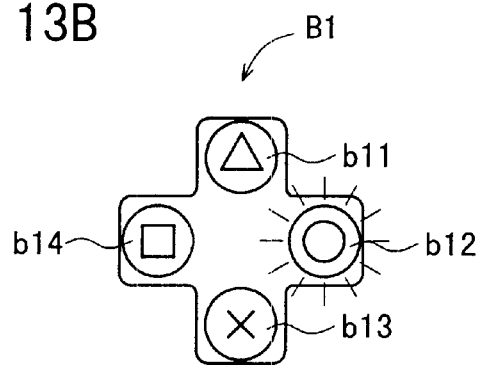
Figure 13C:
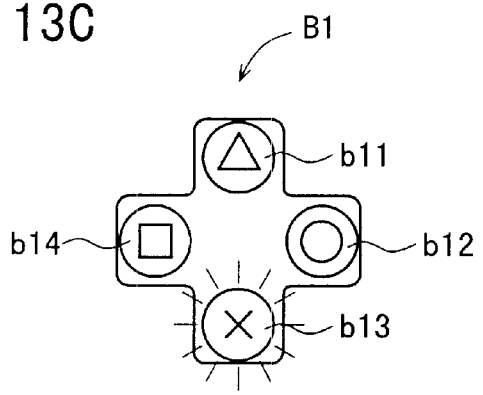

Alternatively, control members b11, b12, b13, b14 of the control member group B1 may emit light successively for a predetermined period of time, as shown in FIGS. 13A, 13B, 13C.

If the start button 69 is pressed in step S3, then control goes to step S7 in the second mode to perform a video game playing process. The video game playing process comprises steps S11 through S14 shown in FIG. 14, and is continuously carried out until a video game end is determined in step S8 in FIG. 11.

In the video game playing process (step S7) shown in FIG. 14, if a light emission command is generated in step S11, then light emission data is read in step S12. Specifically, the CPU 82 reads light emission data (light emission sequences) corresponding to the light emission command from an association table shown in FIG. 15 which is stored in the main memory 84, generates a control signal, and sends the generated control signal to the manual control input device 2. The association table shown in FIG. 15 contains light emission data (light emission sequences) in association with light emission commands.

For example, if a light emission command A is generated in the video game playing process, then the CPU 82 reads a light emission sequence (the control member groups B1, B2, B3, B4) corresponding to the light emission command A from the association table, generates a control signal corresponding to the light emission sequence, and sends the generated control signal to the manual control input device 2.

Figure 16:
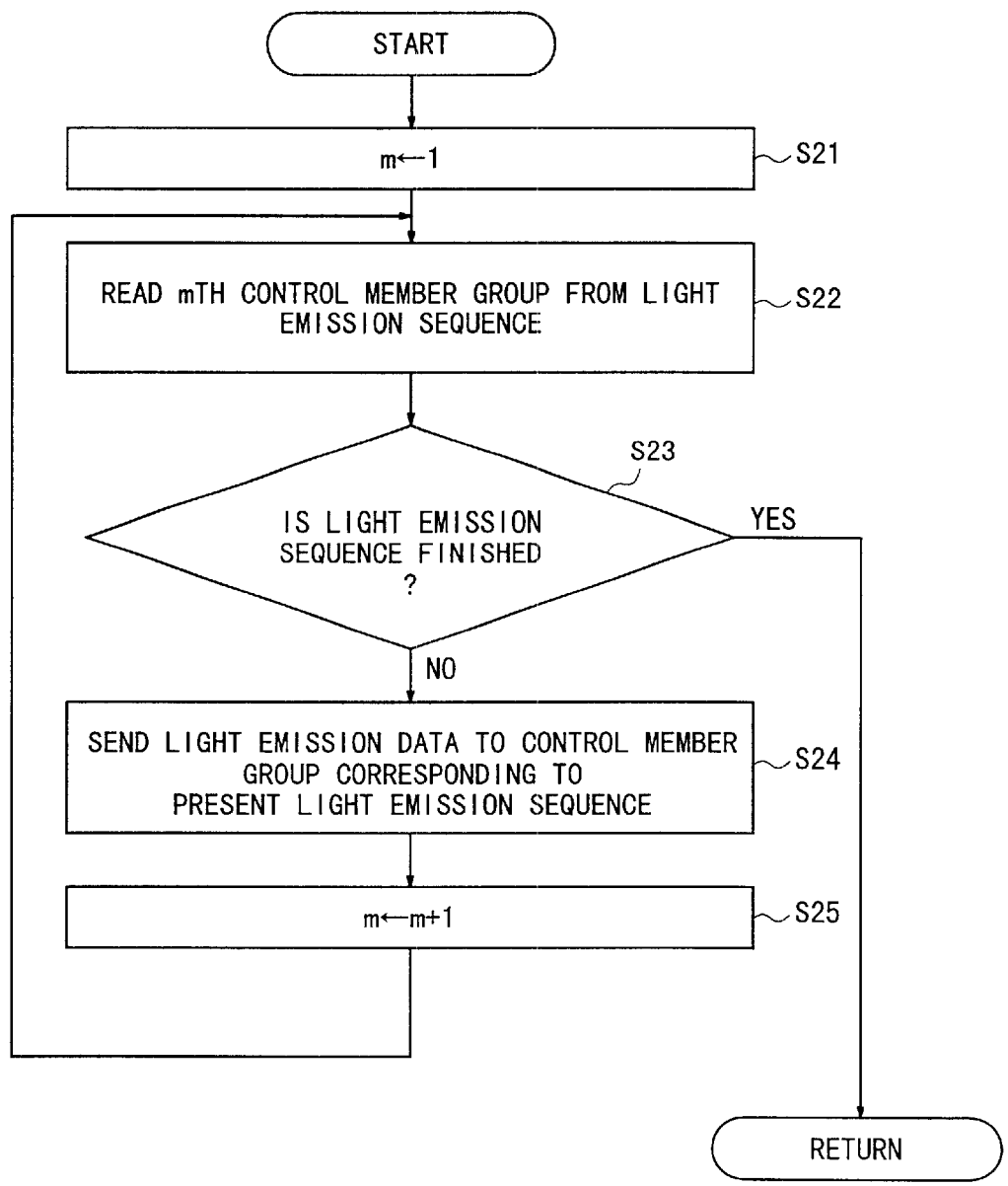
FIG. 16 is a flowchart of a light-emission routine (subroutine) in the second mode of processing operation.

In step S14, a light emission routine (subroutine) shown in FIG. 16 is executed. Specifically, the value of an index register m is set to "1" in step S21, and an mth control member group is read from the light emission sequence read in step S12 in step S22. Then, it is decided whether the light emission sequence is finished or not in step S23. If not finished, then light emission data is supplied to the present mth control member group in step S24. Now, the LEDs of the switch elements of the present mth control member group of the manual control input device 2 are energized to emit continuous or flickering light.

In step S25, the value of the index register m is incremented by "1". Control then goes back to step S22 to read a next control member group from the light emission sequence read in step S12. The processing in steps S22 through S25 is repeated to enable the control member groups to emit light successively according to the present light emission command. Since light emission commands change depending on the progress of the video game, light emission sequences for the control member groups also change depending on the progress of the video game. For example, the control members of the manual control input device 2 emit continuous or flickering light in timed relationship to continuous or flickering light emission of a game character or object displayed on the display monitor 6.

If the light emission sequence for the present light emission command is finished in step S23, then the light emission routine shown in FIG. 16 comes to an end.

Control then returns to the routine shown in FIG. 14. It is decided whether the video game is over or not in step S15. If the video game is not over, then control goes back to step S11 to wait for a next light emission command.

In each of the light emission sequences, each of the control members, once its LED is turned on, may emit continuous light either for a limited period of time before the light emission sequence ends or continuously until the light emission sequence ends, or may emit flickering light either for a limited period of time before the light emission sequence ends or continuously until the light emission sequence ends.

As described above, after the manual control input device 2 is connected to the video game machine 4 and turned on, the two modes (the first and second modes) are selectively executed depending on whether the start button 69 is pressed or not.

Specifically, after the manual control input device 2 is connected to the video game machine 4 and turned on, if the start button 69 is not pressed, then the first mode is carried out to enable the control members of the manual control input device 2 to emit continuous or flickering light. After the manual control input device 2 is connected to the video game machine 4 and turned on, if the start button 69 is pressed, then the second mode is carried out to enable the control members of the manual control input device 2 emit continuous or flickering light in timed relationship to continuous or flickering light emission of a game character or object displayed on the display monitor 6. As a result, the game player is able to enjoy the video game because of visual sensations produced by the manual control input device 2.

The entertainment system according to the present invention is not limited to the video game apparatus 1. The light emission of the control members of the manual control input device 2 may be controlled by the CPU in the manual control input device 2.

According to such a modification, the CPU of the one chip microcomputer 22 in the manual control input device 2 sends light emission data to the control member groups or the control members of the manual control input device 2. Therefore, the light emission of the control members is controlled within the manual control input device 2.

One application of the above light emission control is that after the power supply switch 77 of the manual control input device 2 is turned on, the CPU of the one-chip microcomputer 22 enables the control member groups or the control members to emit continuous or flickering light for a certain period of time before the game program starts being executed. Consequently, the game player can enjoy visual sensations produced by the manual control input device 2 itself before the video game actually begins.

Although certain preferred embodiments of the present invention have been shown and described in detail, it should be understood that various changes and modifications may be made therein without departing from the scope of the appended claims.

What is claimed is:

1. An entertainment system, comprising:
    a manual control input device for entering control commands, said manual control input device having a plurality of control members divided into a plurality of control member groups;
    a display monitor for displaying a game image;
    a video game machine for generating an image of a game character or object to be displayed on said display monitor in response to control commands entered by said manual control input device to proceed with a video game;
    a memory medium for storing a program for enabling said control members to emit light; and
    processing means for executing said program based on control commands entered by said manual control input device, said processing means including means for enabling each of said control member groups to emit continuous or flickering light.

2. An entertainment system according to claim 1, wherein said program enables said control members to emit light either randomly or according to a predetermined pattern as said video game proceeds.

3. An entertainment system according to claim 2, wherein said program selectively carries out a first mode for enabling said control members to emit continuous or flickering light for a predetermined period of time and a second mode for enabling said control members to emit continuous or flickering light in timed relationship to continuous or flickering light emission of said game character or object displayed on said display monitor.

4. An entertainment system according to claim 3, wherein said processing means comprises means for reading from an association table in said second mode a light emission sequence for said control members corresponding to a light emission command generated in said video game, and for enabling said control members to emit continuous or flickering light based on said read light emission sequence.

5. An entertainment system according to claim 1, wherein said control members are controlled to emit light by a control signal from said processing means.

6. An entertainment system according to claim 1, wherein said processing means includes means for enabling each of said control members in each of said control member groups to emit continuous or flickering light.

7. An entertainment system according to claim 1, further comprising a recording medium storing said program, wherein said memory medium reads said program from said recording medium and stores said read program.

8. An entertainment system according to claim 1, further comprising communication means for communicating with a source, wherein said memory medium reads said program via said communication means and stores said read program.

9. An entertainment system according to claim 1, wherein said program enables said control members to emit light according to a plurality of predetermined sequences as said video game proceeds.

10. A supply medium recorded with a light emission program and data for a manual control input device for use in a video game performed by a video game machine by displaying a game character or object on a display monitor in response to control commands entered by said manual control input device, said manual control input device having a plurality of control members divided into a plurality of control member groups, said light emission program comprising a program for enabling each of said control member groups to emit continuous or flickering light.

11. A supply medium according to claim 10, wherein said program selectively carries out a first mode for enabling each of said control member groups to emit continuous or flickering light for a predetermined period of time and a second mode for enabling each of said control member groups to emit continuous or flickering light in timed relationship to continuous or flickering light emission of said game character or object displayed on said display monitor.

12. A supply medium according to claim 11, wherein said program reads from an association table in said second mode a light emission sequence for said control members corresponding to a light emission command generated in said video game, and enables said control members to emit continuous or flickering light based on said read light emission sequence.

13. A supply medium according to claim 10, wherein said program further comprises enabling said control members of said manual control input device to emit light either randomly or according to a predetermined pattern as said video game proceeds.

14. A manual control input device for supplying control commands to a video game machine in response to manual control inputs, comprising:

a plurality of control members divided into a plurality of control member groups; and control means for enabling each of said plurality of control member groups to emit continuous or flickering light.

15. A manual control input device according to claim 14, wherein said control means includes means for enabling each of said control members in each of said control member grounds to emit continuous or flickering light.

* * * * *

UNITED STATES PATENT AND TRADEMARK OFFICE
CERTIFICATE OF CORRECTION

PATENT NO. : 6,402,616 B1
DATED : June 11, 2002
INVENTOR(S) : Hiroki Ogata et al.

It is certified that error appears in the above-identified patent and that said Letters Patent is hereby corrected as shown below:

Column 8,
Line 28, after "apparatus" insert -- 1 --.

Column 9,
Line 2, cancel the word "to".

Signed and Sealed this

Twenty-first Day of January, 2003

JAMES E. ROGAN
*Director of the United States Patent and Trademark Office*